UNITED STATES PATENT OFFICE.

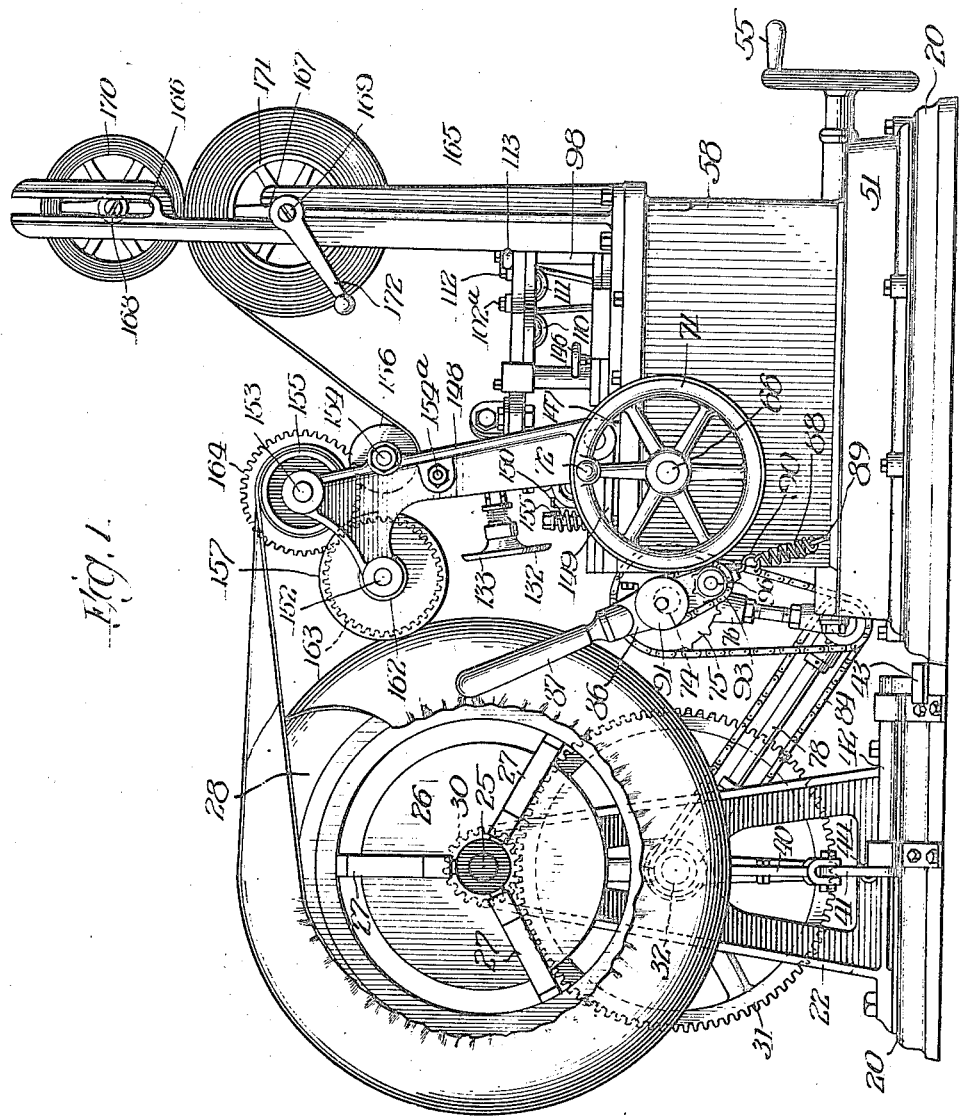

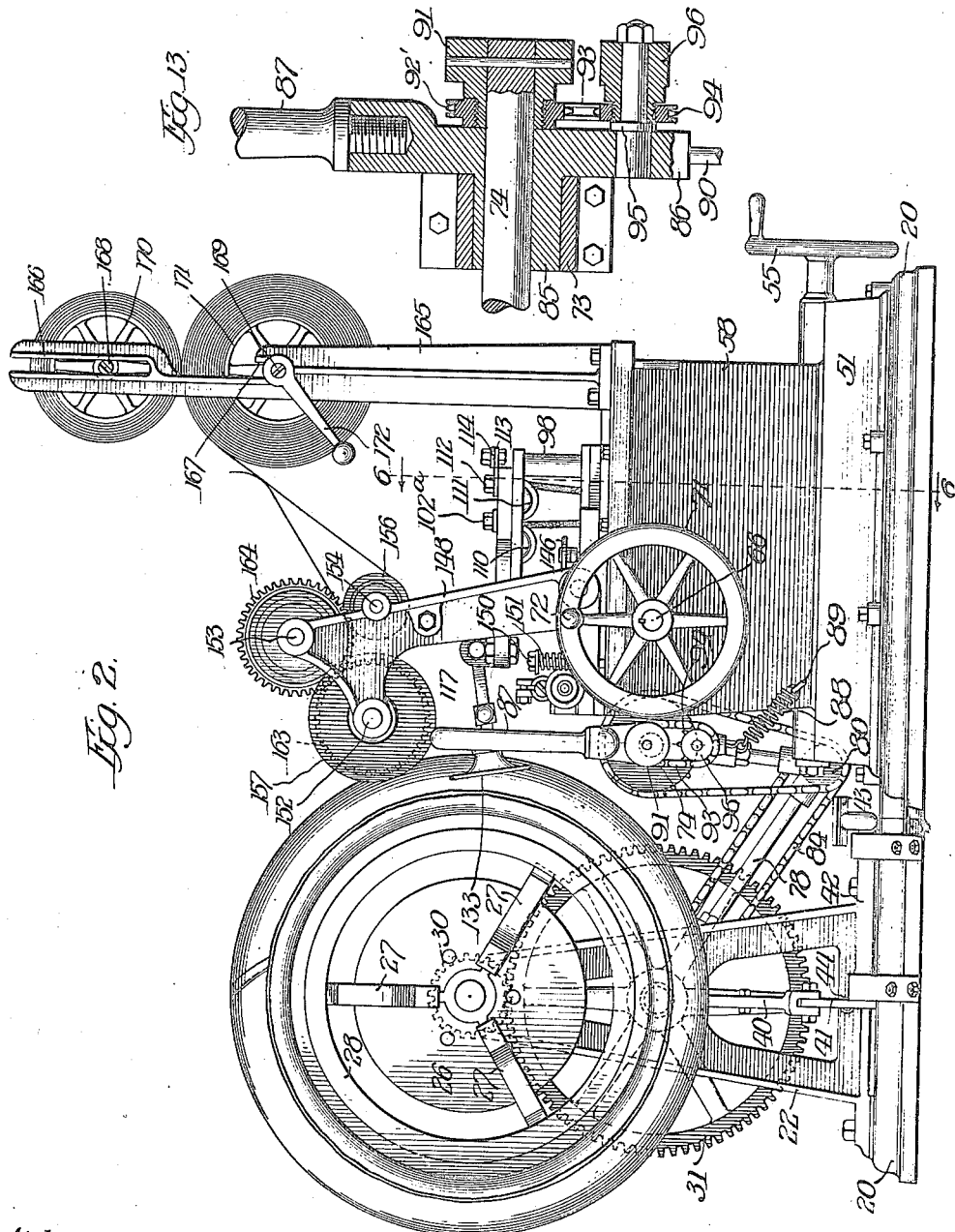

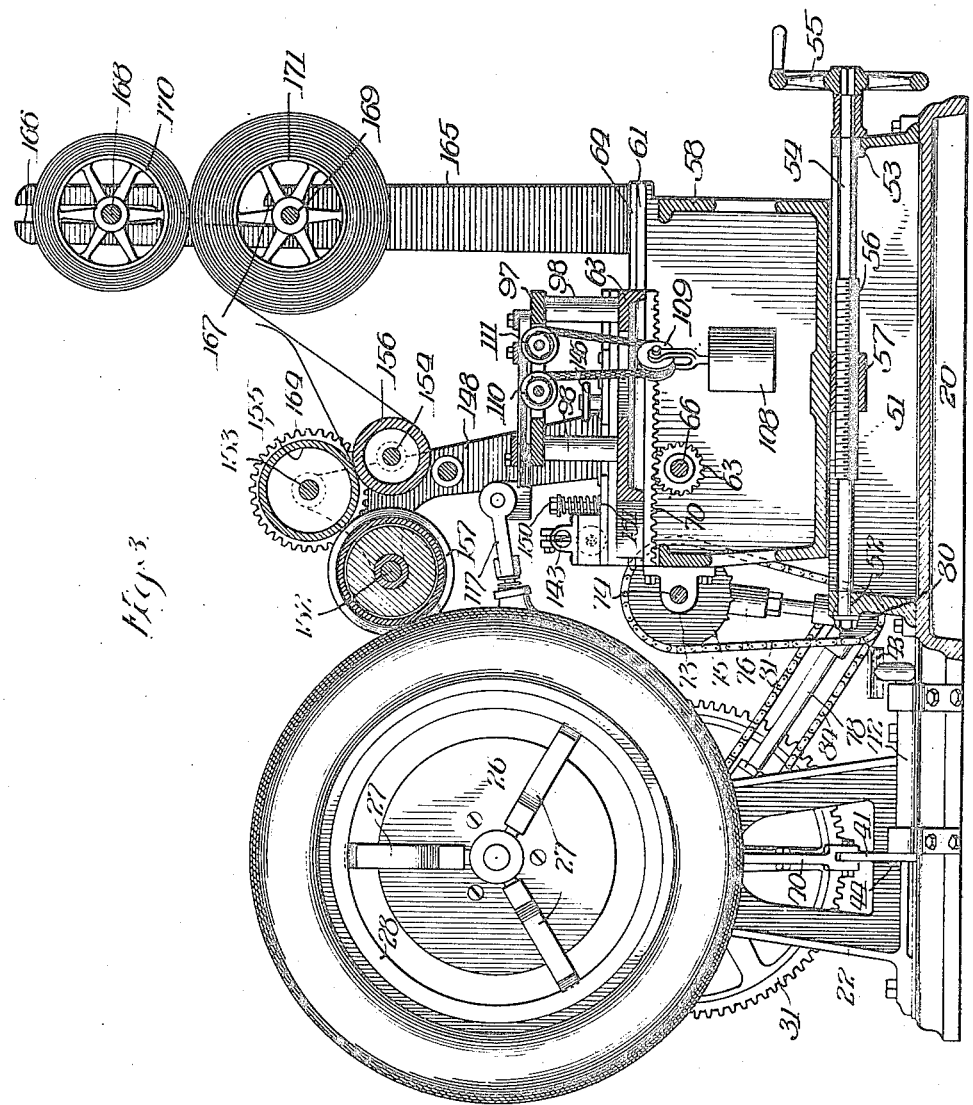

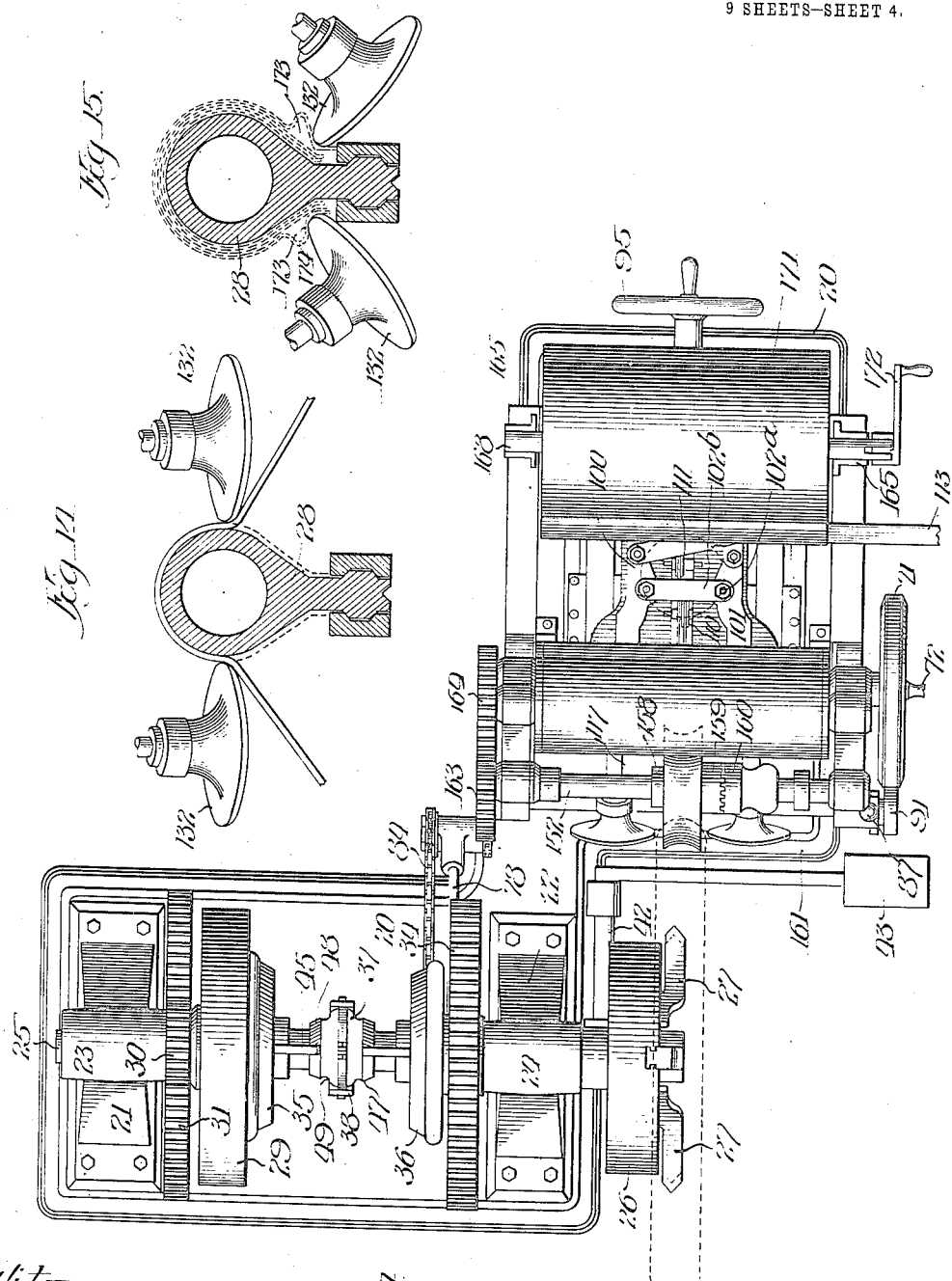

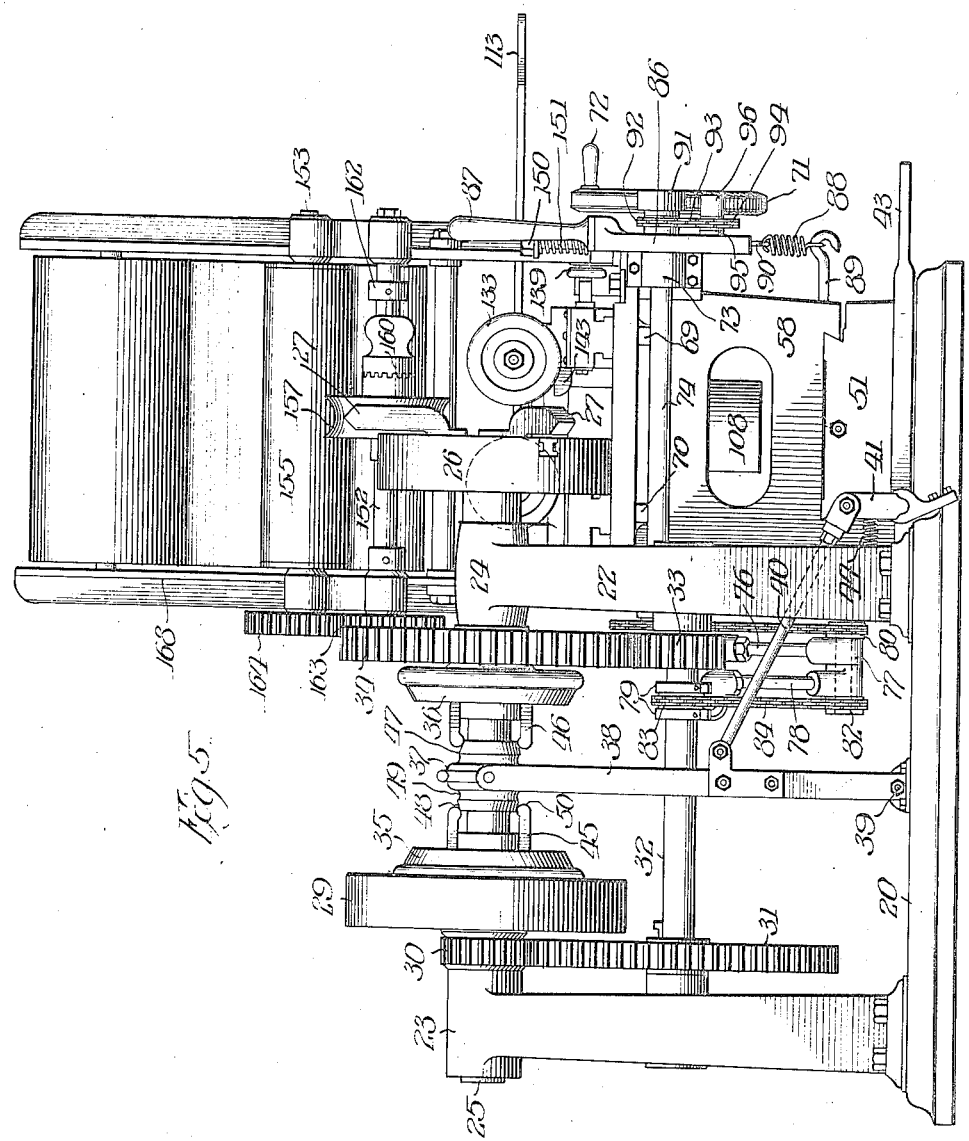

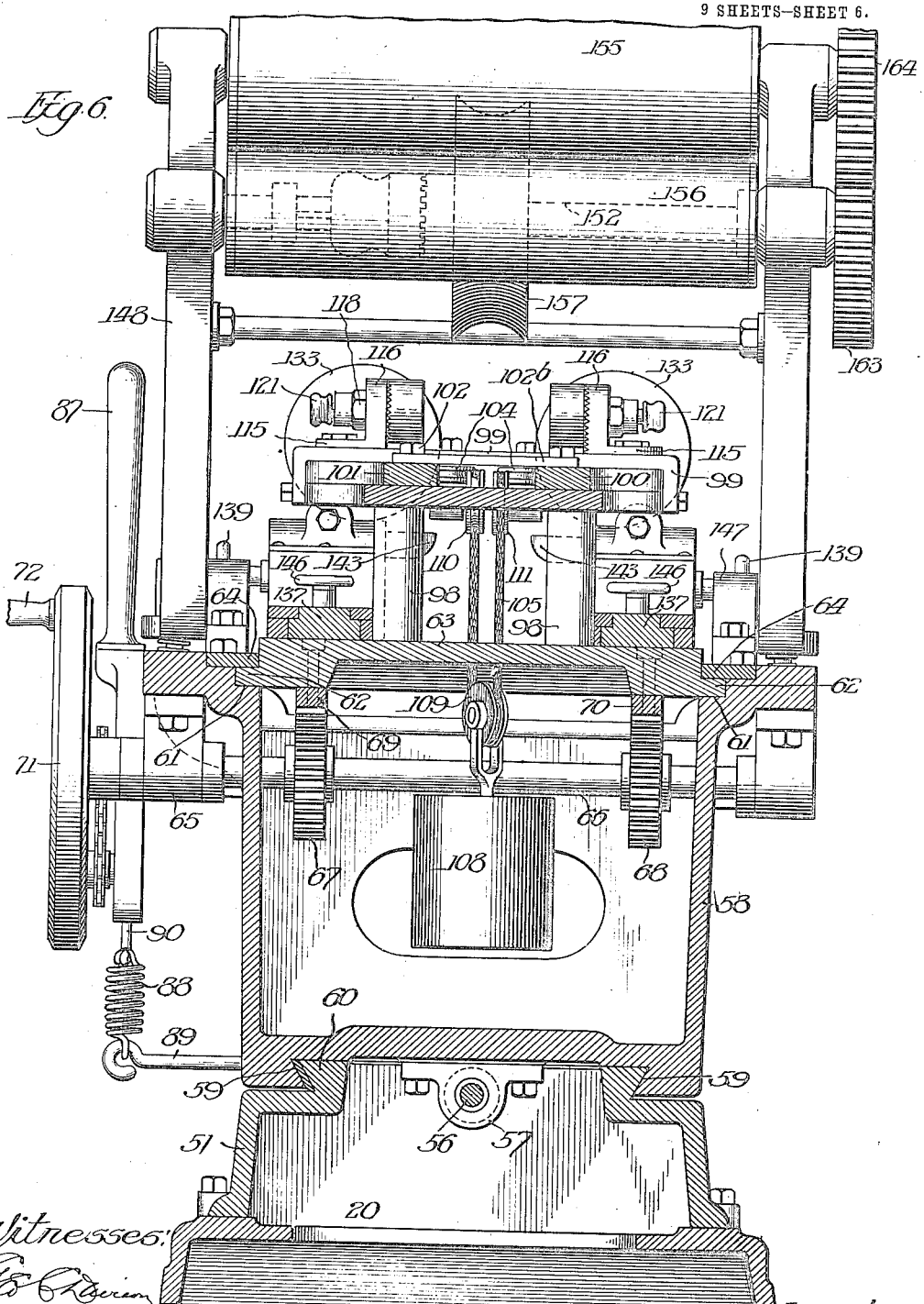

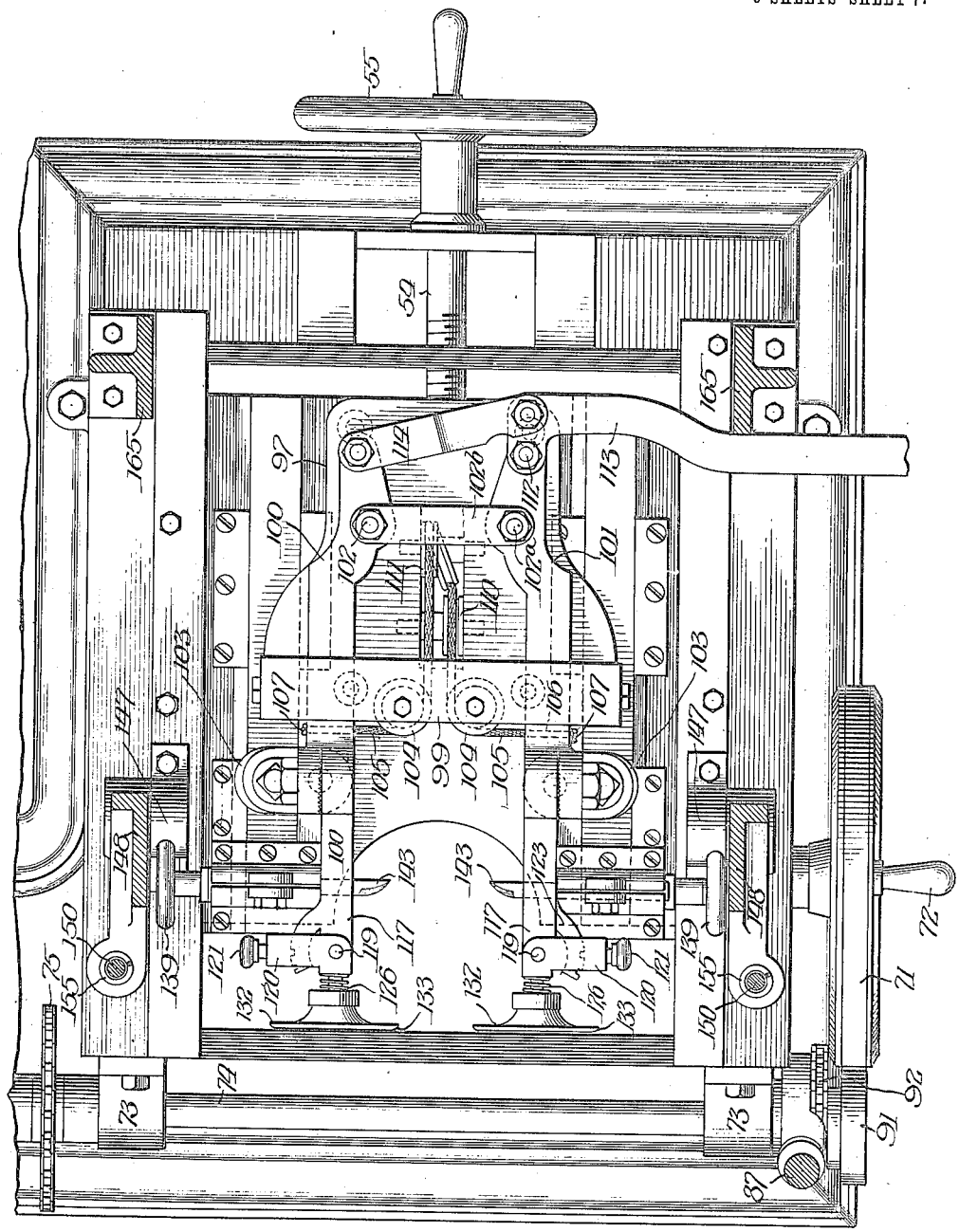

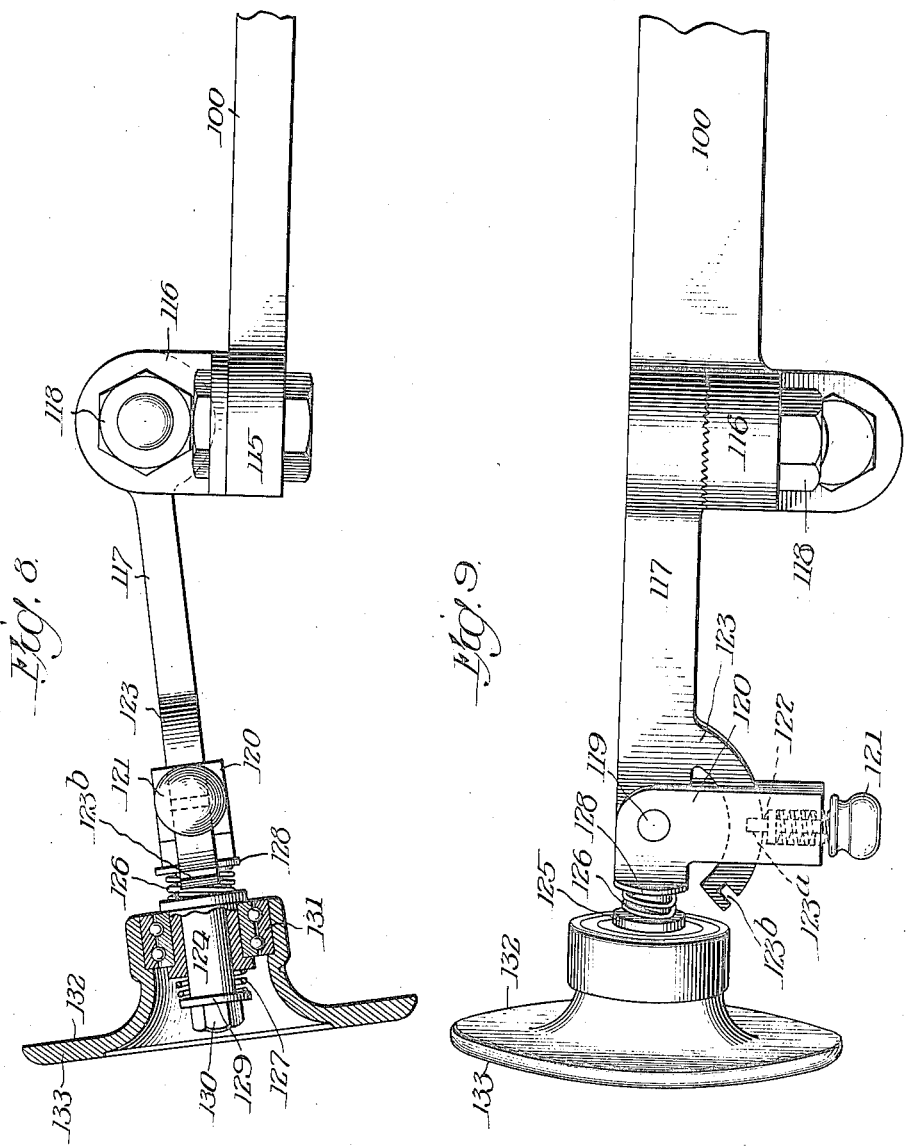

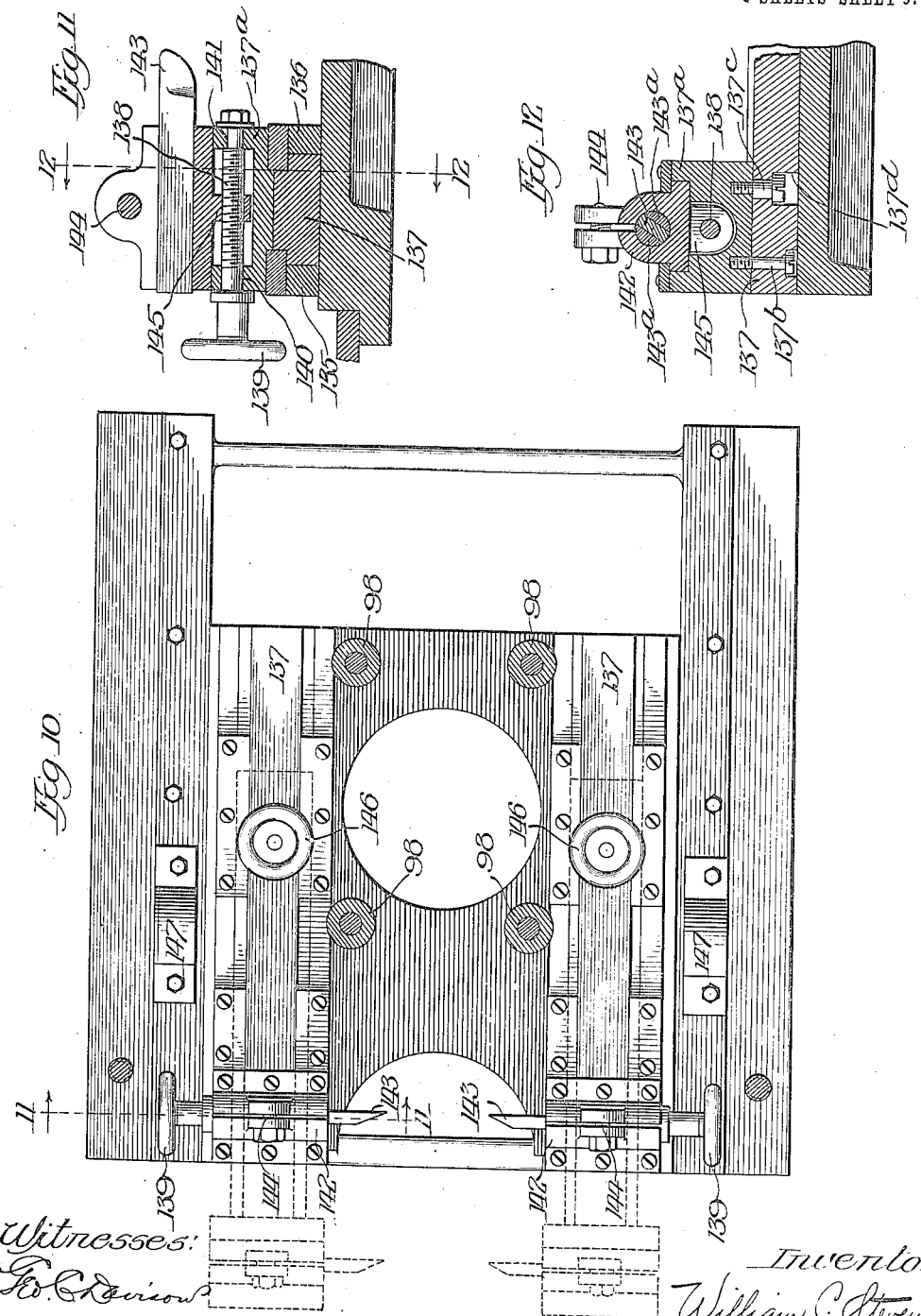

WILLIAM C. STEVENS, OF AKRON, OHIO, ASSIGNOR TO THE FIRESTONE TIRE & RUBBER COMPANY, OF AKRON, OHIO, A CORPORATION OF OHIO.

MACHINE FOR MAKING TIRE-CARCASSES.

1,253,105.      Specification of Letters Patent.      Patented Jan. 8, 1918.

Application filed April 12, 1913. Serial No. 760,615.

*To all whom it may concern:*

Be it known that I, WILLIAM C. STEVENS, a citizen of the United States, residing at Akron, in the county of Summit, State of Ohio, have invented certain new and useful Improvements in Machines for Making Tire-Carcasses, of which the following is a specification.

This invention relates to appliances employed in the making of automobile, motorcycle, and similar tire-casings, or shoes, and concerns more particularly means for applying to and shaping on an annular rotatable tire-core, successive layers or plies of adhesive rubber-impregnated or frictioned tire-fabric, in such manner that the plies will all be stretched with proper uniformity to the same degree regardless of their differences in dimensions and other physical conditions, to give each other in the completed tire-structure mutual support by reason of their cumulative and uniform capacity for resistance.

Heretofore, machines have been constructed in which the tread-portion of the tire-fabric has been overstretched in order to cause the ply to conform roughly to the contour of the core and to reduce the amount of fullness or surplus in the fabric to be cared for or absorbed at the sides of the core, but in the use of these devices, in addition to the objectionable and weakening excessive stretching, wrinkles and other defects have occurred in those portions of the fabric applied to the sides of the core, dependence being placed upon a subsequent elimination of such wrinkles, either wholly or partially. The resulting detrimental effects of these defects thus occurring are not, however, completely overcome by the subsequent removal or smoothing out of the wrinkles or folds. In the operation of my improved machine, although the fabric is stretched only the required amount to maintain the finished tire-shoe or casing in normal shape and with proper strength, nevertheless, in applying the fabric to the sides of the core, no wrinkles or similar defects are permitted to form. In other words, I avoid the effects of and presence of such defects in the completed tire-casing or shoe by preventing their occurrence as the fabric is smoothed down on to the form or core, rather than placing dependence upon an attempted elimination of such faults after they have occurred.

In addition, another aim of the invention is the production of a tire-carcass or casing in the manner indicated on a machine of simple structure having a novel disposition of the fabric-smoothing and applying elements, the labor cost of constructing the tire-casing or shoe being materially reduced, as well as providing a more generally uniform product with better wearing qualities than it has been possible heretofore to produce.

The fulfilment of these and other objects and purposes will be understood and appreciated by those skilled in this art from a consideration of the following detailed description of a machine of this character representing a preferred embodiment of the invention, such machine being illustrated in the accompanying drawings forming a part of this specification, and to which reference should be made in connection with the specification.

In these drawings:

Figure 1 is a front view of the machine showing the parts of the mechanism in their positions during the fabric-stretching operation;

Fig. 2 is a similar view showing the positions of the parts during the fabric-smoothing and applying operation;

Fig. 3 is a longitudinal section through the machine, the parts being in the same position as illustrated in Fig. 2;

Fig. 4 is a plan view of the machine;

Fig. 5 is an end elevation;

Fig. 6 is an enlarged vertical cross-section on line 6—6 of Fig. 2.

Fig. 7 is an enlarged horizontal section;

Fig. 8 is a fragmentary elevation partly in section of one of the fabric-smoothing rollers and its support;

Fig. 9 is a plan view of the construction shown in Fig. 8;

Fig. 10 is a horizontal section illustrating the mountings for the trimming-knives;

Fig. 11 is a section on line 11—11 of Fig. 10;

Fig. 12 is a section on line 12—12 of Fig. 11;

Fig. 13 is a section through the eccentric bearing for one end of the shaft 74, and Figs. 14 and 15 are sections illustrating the action of the fabric-applying rollers on the fabric.

Referring to these drawings, it will be apparent that this machine is composed of two coöperating parts—one, the mechanism for supporting and rotating the chuck or spider and tire-form or core, and the other, the means for applying the plies of frictioned or similar tire-fabric to such form. I will first describe the construction of the form-supporting and revolving mechanism and then the fabric-stretching and applying means.

Rising from one section of a right-angle base 20, (Figs. 4 and 5), is a pair of standards or pillars 21 and 22, having at their upper ends alined bearings 23 and 24 accommodating a shaft 25 carrying at one end a universal expansible chuck or spider 26 equipped with three arms 27, adapted to engage and support the usual tire-form or core 28 on which the tire-casing or carcass is built up by the application of a plurality of plies of frictioned or adhesive tire-fabric. The form and style of this expanding-chuck is, of course, immaterial, so long as the tire-form or core can be readily applied thereto and removed from it with facility and despatch. In this art, the body of superposed layers or plies of adhesive rubber-impregnated fabric before the completion of the casing or shoe by applying thereto the tread and other parts, and the curing of the tire, is known as a carcass.

Between the bearings 23 and 24, shaft 25 has loosely mounted thereon a driving-pulley 29 rotated from any source of power, as by a belt, (not shown). Fixed to such pulley at one side thereof and also loosely rotatable on said shaft, I provide a pinion 30 meshing with a gear 31 keyed to a lower shaft 32 revoluble in suitable bearings in the standards 21 and 22. Shaft 32 is also equipped with a pinion 33 in mesh with a gear 34 loose on shaft 25, this train of gearing constituting the well known back gearing provided for a reduction of speed.

Pulley 29 is supplied with a clutch-mechanism 35, gear 34 also having a clutch device 36, either of which may be thrown into action by the shifting of a central common clutch sleeve 37 slidable in either direction on the shaft 25 by means of a yoke 38 pivoted to the base at 39 and connected by a link 40 with the crank-arm 41 upstanding from one end of a suitably journaled rock-shaft 42 having connected at its opposite end a pedal or foot-piece 43. In order to hold the yoke 38 and the slidable clutch-sleeve 37 in neutral or inoperative position, that is, centrally between the two clutch devices, with neither clutch active, I interpose between the arm 41 and the adjacent standard a coil-spring 44. Clutch 35 is provided with a plurality of arms 45 projecting in the direction of the sleeve 37 and the companion clutch 36 has similar arms 46. In order to expand these latter arms, the adjacent portion of the sleeve 37 is beveled at 47, and the other end of the sleeve 37 is likewise beveled or tapered at 48 and is in addition supplied with an annular recess 49 adapted to receive the enlarged ends 50 of arms 45, such co-action of the arms with the groove acting to retain the clutch-sleeve in its lefthand position as the parts are viewed in Fig. 5, against the retracting action of spring 44.

When it is desired to rotate the chuck and form or core slowly, during the application and stretching of the tread-portions of the plies, the operator steps on pedal 43, causing a shifting of the sleeve 37 to the right, as viewed in Fig. 5, rendering the clutch 36 active to couple gear 34 to shaft 25, bringing about a relatively slow rotation of the latter. When the operator desires to revolve the chuck and core more rapidly, as during the rolling down of the fabric and the trimming operation, he lifts the pedal 43 against the action of spring 44 by placing his toe beneath it, causing a sliding of the sleeve 37 to the left, thereby rendering clutch 35 active and maintaining the same in such condition because of the retention of sleeve 37 in the shifted position by the engagement of the enlarged ends 50 of the arms 45 in the groove 49. As will be readily understood, under these conditions, shaft 25 will be rotated rapidly because the pulley 29 is directly clutched thereto. To stop the rotation of the chuck and form for the removal of the core and carcass, for example, the operator presses gently on the pedal 43, permitting the sleeve 37 to come to neutral position, in which it will be maintained by the action of spring 44. If the operator desires to stop the rotation of the core after the completion of the stretching operation, he merely lifts his foot from the pedal and the latter will automatically rise to neutral position so that neither clutch will be operative.

The other portion of the right-angle base 20 has bolted thereto a hollow box-section 51 having journaled in its end-walls at 52, 53, the cylindrical end-portions of a shaft 54, which projects out of the box 51 at one end, the protruding portion having fastened thereto a handle 55 of any suitable form, (Fig. 3). The central section of shaft 54 is slightly enlarged and screw-threaded at 56, such part passing through a similarly threaded bearing or box 57 bolted to the bottom surface of a hollow box slide or carriage 58, shaped at 59, 59, (Fig. 6), to fit over and coöperate with the longitudinal dovetail-shaped rib 60 on the top of the supporting box-section 51. In its top, (Fig. 6), this carriage or main slide 58 is provided with a pair of guideways 61, 61, slidingly receiving the marginal guiding-ribs 62, 62, of an upper slidable-carriage 63, the ribs 62 being held in the guideways 61, 61, by suitable retaining-bars 64, 64, overlapping them and bolted in place to the member 58. The latter has externally fastened thereto a pair of depending bearings 65, 65, rotatably accommodating a cross-shaft 66 supplied internally of the hollow-slide or carriage 58 with a pair of gears 67 and 68, the teeth of which mesh with those of two inverted racks 69 and 70 fastened to the bottom surface of the carriage 63, whereby the latter may be advanced and retracted. At the front of this machine, shaft 66 has fastened thereto a friction drive-wheel 71 equipped with a handle 72, which permits of the manual rotation of shaft 66 and the resulting travel of the slide 63, as will be obvious. In order to permit a power rotation of the shaft 66, I mount at the inner end of the hollow member or slide 58, bearings 73, in which is adapted to revolve a transverse-shaft 74 carrying at its inner end a sprocket-wheel 75 and one end of a spacing-link 76, (Figs. 1 and 3), which at its lower end is pivotally connected by a short-shaft 77 to the lower end of another spacing-link 78, the upper end of the latter being bifurcated at 79, (Fig. 5), and adapted to rock on shaft 32. At one end of shaft 77 I employ a sprocket-wheel 80 connected to the sprocket-wheel 75 by sprocket-chain 81, and at the opposite end of shaft 77 I employ a similar sprocket-wheel 82 operatively connected with another sprocket-wheel 83, fixed to shaft 32 between the arms 79, by means of a second sprocket-chain 84. It should be apparent from this construction that the shaft 74 is at all times rotated at a uniform speed through power delivered from the jack-shaft 32 by means of the sprocket mechanism described, the elbow or link connection permitting, as will be readily understood, the sliding of the carriage 58 back and forth without breaking or interfering with the shaft-driving connection referred to. In other words, the sprocket mechanism is capable of extension and contraction to accommodate itself to the position of carriage 58 and shaft 74.

Shaft 74, instead of being directly mounted in the bearing 73 at the front of the machine, is rotatably received in an apertured boss 85, (Fig. 13), forming a part of a lever 86 and rotatable in the bearing 73, the shaft-receiving aperture extending through the boss and lever being eccentrically disposed with relation to the cylindrical exterior of the boss. At its upper end, the lever 86 has fastened thereto an operating-handle 87, the combined lever and handle being held in normal position by a coil-contractile spring 88, (Fig. 1), secured at its lower end to a stud 89 projecting outwardly from the carriage 58, the upper end of the spring being fastened by means of an eye 90 to the lower end of the lever. At its forward end shaft 74 has fixed or pinned thereto a friction-roller 91 adapted by manipulation or rocking of the combined handle and lever 87, 86, to be thrown into and out of driving peripheral frictional engagement with the wheel 71 on shaft 66, and by this means the rotation of shaft 74 can be transmitted to shaft 66 to slide the carriage 63 and the various parts carried thereby described hereinafter.

Fixed to the hub of roller 91, (Fig. 13) between the lever 86 and the friction-roller, I provide a sprocket-wheel 92 co-acting with which is a sprocket-chain 93 passing around another sprocket-wheel 94 fixed to the hub of a smaller friction-roller 96 revoluble on a stud 95 secured to the lower end of lever 86. The roller 96 is also adapted by the rocking of the handle 87 in the opposite direction to be thrown into and out of frictional engagement with the edge of wheel 71, its rotation being derived by the mechanism described from the shaft 74. By means of these two rollers 91 and 96, the operator, by manipulation of the handle 87 may impart two different speeds of rotation to the shaft 66, which, of course, means two different speeds of advance of the carriage 63 and the parts mounted thereon.

A plate 97 is mounted on the carriage or slide 63 some distance above the same, by means of a plurality of supporting posts or pillars 98, and has fastened thereto and extended across the top of the same, a bridge-piece 99 beneath which is a pair of shaped bars or arms 100 and 101 fulcrumed on a pair of studs 102 and 102ᵃ on the plate 97 and connected together above the arms by a strengthening cross-bar 102ᵇ, each of the arms 100 and 101 having at its forward end an outward laterally-offset slotted-ear 103, (Fig. 7). This bridge-piece 99 on its under side and near its center, carries a pair of suitably mounted revoluble grooved pulleys or sheaves 104, 104, passing around which is a cord or cable 105, the two ends of which extend through holes 106 in the pair of arms 100 and 101, the ends of the cord being knotted at 107 to prevent their withdrawal through the holes. This cord 105 supports a weight 108 provided with a supporting pulley 109, (Fig. 6), the cord also passing over two suitably arranged and properly supported pulleys 110, 111 disposed in vertical planes, as shown in Fig. 7. It should, therefore, be clear that the weight of the member 108 is imposed equally upon the two arms or bars 100 and 101, tending to draw them together, yet permitting each to have an independent individual movement and at all times, the pull on the two bars will be equal and unvarying. On the bar or arm 101 at 112, (Fig. 7), I fulcrum the short leg or end of a right-angle handle 113, and I connect such handle with the companion arm 100 by means of a link 114 pivoted to each.

Each of the slotted ends 103 of the fulcrumed arms 100 and 101, has adjustably bolted thereto a right-angle bracket 115 having an upstanding portion or ear 116 with a roughened face against which is held the end of an arm 117 in such manner as to be capable of vertical angular adjustment, the arm being held or maintained in the desired position by means of a bolt 118 passing through the parts 116 and 117. As is described hereinafter, each of these arms 117 carries at its other end a fabric-smoothing and applying roller, and this angular adjustment of the arm permits the roller to be tilted in a plane oblique to the path of rotation of that portion of the core being acted upon by the roller. In ordinary operation, these arms slope downwardly slightly to secure this desired tilting or obliquity of the roller.

Each of the arms 117 has pivoted thereto at 119 near its end, a right-angle member 120, one leg of which is equipped with a spring-pressed locking-detent 121, the inner end 122 of which is adapted to co-act with two notches 123$^a$, 123$^b$, in a sector 123, integral or rigid with the arm 117, such construction of parts permitting angular adjustment of the member 120 in two positions, as will be readily understood. The other leg of the right-angle member has a cylindrical portion 124 mounted on which I employ a sleeve 125 received between a pair of coil-springs 126 and 127 encircling the shaft 124, each spring bearing at one end against an end of the sleeve 125 and at its other end against a washer 128 or 129, the latter and associated parts being held in proper assembled relation on the shaft 124 by a nut 130 secured on a reduced threaded end of the shaft. The sleeve 125, (Fig. 9), carries a ball-bearing 131 for a fabric-smoothing roller 132 of peculiar disk-like formation, the working-edge portion 133 of such roller being curved in approximately the form illustrated. As is clearly shown, the hub-portion of this roller houses and covers its ball-bearing and associated parts of the mechanism. The recess in the front face of the roller enables me to bring the nut 130 and other parts inwardly of such face so that the face is practically an unobstructed plane.

The member 120, as has been explained, is capable of angular adjustment in two positions around the stud 119, permitting the plane of the roller to be shifted as required, and the plane of such roller is perpendicular to the general plane of the core, being held in such position by the detent 122 engaging notch 123$^a$, except when shifted as described hereinafter.

The carriage or slide 63 is not only apertured at 134 for the passage therethrough of the weight-supporting cord or cable 105, the weight being received within the member 58, but it is also equipped at each side with a pair of guideway-members 135 and 136 acting as guides for a pair of slides 137. Each of such slides at its inner end carries a knife-holder 137$^a$ angularly adjustable on the slide around a screw 137$^b$ and capable of being held in adjusted position by a tightening-screw 137$^c$, which passes through a slot 137$^d$ in the slide 137. Each of the knife-holders 137$^a$ has a transverse rotatable screw 138 supplied with a turning-handle 139, cylindrical portions of such screw being rotatable in suitable bearings 140 and 141 in the holder. Each holder also carries a split-clamp 142 provided with a cylindrical aperture therethrough for the accommodation of a trimming-knife 143 and two segments 143$^a$ disposed on opposite sides of the knife and permitting an angular adjustment of the knife about its own axis in the clamp, the knife and segments being held in adjusted position by means of clamp-tightening screw 144. This clamp has a depending screw-threaded ear 145 through which the screw 138 passes, permitting transverse movement of the knife relatively to the slide 137 by turning the handle 139. In order that these slides may be fixedly held in proper adjusted position lengthwise of the guideways in which they are received, each has a set-screw 146 with a suitable handle for its tightening and loosening.

As is clearly shown in Fig. 10, the two knives 143, 143, extend inwardly toward one another and are adapted to be fed inwardly to trim off the surplus fabric at the inner edges of the finished carcass.

Also on the sliding-box or member 58, in suitable bearings 147, 147, I hinge two side-members 148 of a carriage or rocking-frame, each of such members having at its lower end a laterally-extended apertured arm 149 through the hole of which passes a screw 150 threaded at its lower end into a correspondingly threaded hole in the slide or carriage 58, and encircling such screws between their heads and the legs or arms 149, I employ coil compressing-springs 151 tending to rock the frame or carriage, composed in part of the side-members, in a direction toward the core. These two-side members are connected together by a pair of tie-rods 154 and 154$^a$ on the former of which is loosely rotatably mounted a fabric guide-roller 156. Each of these side-members has bearings for two cross-shafts 152 and 153, the latter having fixed thereto a stretching drum 155 supplied with a friction-surface such as would be provided by applying to the drum a layer of rubber-impregnated frictioned fabric, such as is used in the building-up of the carcasses. Shaft 152 has loosely mounted thereon and centrally thereof, a retarding or checking-roller 157 with a soft-rubber concave-face shaped to conform substantially to the curvature of the face of the tire-core 28. This roller bears against a collar 158 fixed to the shaft at one side thereof, and has fastened to its opposite face one toothed member 159 of a clutch mechanism, the companion member 160 of which is similarly toothed and provided with a handle 161, such member 160 being splined to and slidable on the shaft 152 so as to be capable of clutching the roller 157 to the shaft and unclutching it therefrom. The outward movement of the clutch-member 160 is limited by means of another collar 162 fixed to the shaft. When the roller 157 bears against or presses on the tire-core or the fabric-plies applied thereto, owing to the frictional engagement between the parts, they both have the same surface speed. In order that the stretching roller 155 may positively and uniformly travel at a surface speed different from that of the checking-roller 157, I employ a gear 163 on the end of shaft 152, which meshes with the gear 164 on the end of shaft 153 and so choose the size of the gears and the diameter of the stretching-roller that each ply will be given a definite uniform stretch throughout its central part.

On the carriage or slidable box 58, at one end, I mount a pair of upright standards 165, each provided with a pair of slotted bearings 166 and 167 for the reception of the ends of shafts 168 and 169 carrying the drums 170 and 171 respectively, the former being adapted to have wound up thereon the usual cotton cloth liner separating the plies on the drum 171 as such liner and plies are unwound from the latter drum. This upper drum 170 and as much of the liner as has been wound thereon, rest directly on the surface of the combined frictional plies and liner wound on the supply-drum 171 in a common and well known manner, so that as the latter is revolved to draw off a fabric ply the drum 170 is similarly rotated to wind up the liner thereon. Shaft 169 is equipped with a detachable handle 172 for a purpose hereinafter indicated.

The operation of this machine takes place substantially as follows:

The operator places in the bearings 167 a shaft 169 carrying a drum 171, having wound up thereon in proper sequence the supply of plies of rubber-impregnated or frictioned fabric, the layers of which are separated from one another by the ordinary cloth liner to prevent them from adhering to one another. As is usual in this art, these plies vary slightly both in length and width, the shortest and narrowest ply being the first to be placed on the core and the longest and widest ply being the last one to be applied to the carcass, this difference in length and width being required because of the gradually increasing diameter of the carcass both circumferentially and crosswise and also because the latter plies are placed over the beads. As is usual, these plies are cut on the bias to permit the adhesive rubber-impregnated fabric of the ply to be stretched lengthwise throughout its central part as it is placed on the form or core, for several purposes, among which is the reduction of the amount of fabric which must be pressed or condensed on the sides of the form to avoid wrinkles and similar imperfections.

The man having the machine in charge places the tire-form or core 28 on the universal expansion-chuck or spider 26 and expands or elongates the arms 27 so as to securely retain the core thereon, compelling rotation of the form or core with the shaft 25. Then the workman, by turning the handle 55, advances the carriage or slide 58 toward the form or core until the face of the checking-roller 157 engages the core, and then he turns the handle 55 still further, causing the carriage to advance somewhat more, bringing about a rearward rocking of the carriage or frame 148, 148, 154 and 154ª in the bearings 147 until the feet 149 are raised slightly above the carriage 63 against the downward pressing action of springs 151, such elevation of these feet indicating to the operator the proper position of the carriage. The slide 58 and appurtenant parts remain in this position until the carcass is completed.

Now the workman draws the advance or front end of the first ply of fabric from the supply roll, passes it beneath the loose guide-roller 156 and over the retarding or stretching roller 155, and causes its front end, which is cut off diagonally, to adhere to the form by means of cement, it being understood that the ends of the various plies of fabric on the supply drum are overlapped and thereby temporarily spliced together so that as each ply of fabric is stretched on the core the next succeeding ply assists in the stretching operation, forming an elongation or extension of the ply which is being stretched. In other words, the ends of the adjacent adhesive plies wound up on the supply-drum 171 are stuck together so as to constitute a continuous length of material separable into plies or sections, however, as required.

The person in charge of the machine steps on the pedal 43, throwing the clutch 36 into action, causing a relatively slow rotation of the shaft 25 and the core by means of the back-gearing 30, 31, 32, 33 and 34. During such rotation of the form or core, the clutch-members 159 and 160 are in operative engagement, whereby the rotation of the stretching roller 155, which has a tendency owing to the fabric passing over it to revolve at the same surface speed as the core, is checked or restrained by the frictional engagement of the retarding or checking-roller 157 with the surface of the core. In other words, the roller 155 tends to rotate more rapidly than it actually does, the roller 157 being prevented from more rapid rotation owing to its frictional and checking engagement with the face of the core. Driving contact of the retarding or checking roller 157 with the surface of the core is obtained by the pull of the fabric exerted by the core in its rotation and also by the weight of the hinged frame carrying the stretching mechanism. Because of this positive, uniform, slower, surface speed of the stretching roller 155, and because of the fact that the core is rounded in cross-section, the central zone or middle portion of the fabric ply is stretched longitudinally uniformly throughout its length, and is at the same time, stretched somewhat cross-wise, causing it to adequately, smoothly, and properly adhere to the outer or tread-portion of the core, requiring no rolling or further shaping treatment. This rotation of the core, of course, automatically unwinds the ply and a part of the next succeeding ply from the supply-drum 171.

When the core has completed one revolution, the operator removes his foot from the pedal 43, which automatically swings up under spring action, throwing the clutch 36 out of operation, that is to say, the rotation of the form or core stops, and, during such cessation in the rotation, the man breaks the overlapping splice between the last end of the first ply and the advance end of the second ply, and by means of the handle 172 on the shaft of the supply-roller, rewinds on the latter a portion of the second ply and its liner, the remainder of the second ply being temporarily folded back over the roller 156 out of coöperative relation with the stretching-roller 155.

The first ply of adhesive fabric having been thus stretched on the form and its two ends overlapped the required amount to form a proper splice or joint, it will be found that its central section corresponding to the tread-portion of the tire is shaped to and caused to adequately adhere to the form without wrinkles, air-bubbles or other defects, during such relatively slow rotation of the form and not by the action of the roller 157 which runs over a part of its surface, but rather by the stretching operation itself, the stretching not only elongating the central section of the ply but causing its proper application to the peripheral part of the form. It being understood that each ply is individually stretched on the core and then smoothed down into position on the sides of the core before the next ply is stretched and applied, the ply now on the form is ready for the application of its side-portions to the side faces of the core, such smoothing of the fabric causing its adhesion to the core being accomplished at a higher speed of rotation of the latter than that used during the stretching.

The sides of the form having been coated with cement to secure the proper attachment of the fabric thereto, the operator lifts the pedal 43 by placing his toe beneath it and thereby renders the clutch 35 operative, so that the shaft 25 and the core are rotated directly at a more rapid speed by the pulley 29. The man then by grasping the handle 113 and shifting it to the left separates the rollers 133, and by turning the wheel 71 by the handle 72, advances the carriage 63 until the rollers are opposite the places on the core at which they are to begin their operation. The operator releases handle 113 permitting the weight 108 to pull the rollers toward one another, that is, toward the core, with an equal pressure due to the action of weight 108. He then shifts the handle 87 to the right so as to cause the constantly rotating wheel 91 to frictionally engage the edge of wheel 71, and in this way mechanically and uniformly advances the carriage and rollers toward the axis of the core, these rollers, owing to the action of weight 108, readily following the contour of the core and being pressed toward the core under equal pressures uniformly throughout their traverse.

The core, as is usual in machines of this kind, during the smoothing-down action, is rotated quite rapidly as stated, and the effect of this rotation is to spread out somewhat skirtwise and substantially free from wrinkles, any unattached parts of the ply which is undergoing attachment. During this rapid rotation of the core the springs 151 are useful to prevent the roller 157 and the swinging-frame 148 from bouncing or jumping unduly as the roller passes over the overlapping ends of the ply. The shaping-rollers act upon the fabric just at the junctions of the skirtwise-spread, practically unwrinkled portions with the attached portions. Each of the shaping or smoothing-rollers as has been explained, is desirably tilted in a plane slightly transverse or oblique to the path of rotation of that zone of fabric which the roller is acting on, with the advance edge of the roller more remote from the axis of the core so as to effect an inward wiping, smoothing, and squeegee action on the fabric as it presses it down into place on the core or in the case of later plies, on one of the plies below. Due to this disposition or inclination of the rollers, the latter crowd or press the fabric as they apply it in the general direction of rotation of and progressively toward the center of the form, thereby efficiently and adequately condensing or compressing the fabric to prevent the occurrence of wrinkles, folds, or similar defects, in the applied ply.

Owing to the fact that the ply is cut on the bias, this wiping action of the fabric-applying roller inwardly toward the axis of the core and also in the direction of rotation of the core, due to its tilted position, results in a stretching of the fabric radially or transversely of the core, thereby bringing about a circumferential contraction or shortening of the belt or zone of fabric acted upon by the roller, and the next adjacent belt or zone, in this way preliminarily preparing the latter for its application to an adjoining portion of the core naturally of somewhat lesser diameter. In this manner the roller progressively causes the adhesion of the fabric to the core, first shortening each zone or belt before rolling it down into place. It should be clear that such tilting of the roller not only stretches the fabric transversely of the core, but also condenses or compacts the fabric circumferentially to absorb the fullness.

The working-face of the stitching-roller is essentially that of a rounded edge. It must be sharp enough to produce under pressure the scraping or rubbing effect upon the fabric heretofore referred to, but it must not be sharp enough to cut or abrade the fabric. The fabric-shaping disk or roller should also have a diameter sufficient to give the effective line or tangent of contact a perceptible length, that is, this line of contact should be something considerably more than a mere point. My preferred form of fabric-shaping element is a disk with one face practically flat, the other face being substantially parallel to the first up to near the edge where it is sloped or rounded off to meet the first or back face. This enables the roller to work down closer and more effectively into and over the recess caused by the bead on the tire when the later plies of fabric are worked into place. At the same time, the rounded edge which progresses first in the inward movement of the tool enables me to meet the sharp curve of the bead and to shape and finish this off to good advantage and to prepare the fabric as indicated above for the completer work of the sharper edge. This arrangement of the edge I have found to be perhaps the best in practice. There is just enough dragging action owing to the tilt of the disk to stretch and smooth the fabric properly, while the edge instead of traveling in a line has a path of appreciable width. Its effect is thus better and more uniformly distributed over the fabric. In making tire-casings by hand the operator with one hand pulls or stretches the fabric at intervals toward the center of the core, while with the other hand he works the applying-tool, (a disk-like roller mounted in a handle), by a series of strokes directed tangentially and slightly inwardly on the face of the fabric covering the core, and thus tries to fit and smooth the fabric on the core. My device does this with uniformity and regularity, while the essentially different manually-performed series of acts just alluded to are apt to be more or less inaccurate owing to the possible vagaries and inattention of the operator and the uncertainties of his personal equation.

It will, of course, be understood and appreciated that the parts of this mechanism are so constructed and related to one another that during the inward travel or advance of the rollers from a position adjacent to the tread-portion to the inner part of the core, the latter makes many revolutions, the inward travel of the rollers being progressive and gradual so that they act in sequence upon successive zones or portions of the unapplied fabric to apply them or cause them to be attached to the core in the manner indicated above.

Instead of releasing the handle 113 during this fabric-applying action, the operator may retain such handle in his hand and augment the action of the weight 108 on the rollers, and by holding the handle, may steady somewhat the action of the rollers as they pass over the splices. This, however, is not absolutely essential since the weight itself can satisfactorily perform this function.

The rollers having reached the inner edges of the ply, the operator by means of the handle 113 separates the rollers and by releasing the handle 87 and manually turning the wheel 71 by means of the handle 72, the carriage on which the rollers are mounted is retracted out of operative position ready for the application and stretching of the second ply on top of the first ply. The man working the machine presses on the pedal, permitting it to resume its neutral position, thereby stopping the rotation of the core. He then takes the advance end of the second ply, brings it over the retarding roller 155 and presses it down by hand on top of the first ply. He then slides the clutch-member 160 into engagement with the companion clutch-member 159, the part 160 having been out of such co-action during the previous operation. He again steps on the pedal and brings about the slow rotation of the core, during which the second ply is stretched on the core over the first ply in the same manner that the latter was stretched on the core. In attaching the advance end of the second ply to the first ply, the operator is, of course, careful not to cause an overlapping of splices on the tread-portion of the core. The second ply is stretched in substantially the same manner as the first ply, the rotation of the core then stopped, the splice or joint attended to, and the ply is then smoothed down in place on the sides by the rollers as was the first ply at the higher speed of rotation of the core, bringing about a proper unwrinkled application of such second ply on top of the first, to which it adheres as will be readily understood.

This operation is repeated a sufficient number of times to build up the plies one on another until the desired thickness has been secured; then two circular beads 173, 173, (Fig. 15), are placed on the sides of the carcass under process of construction and caused to adhere thereto. The next ply of frictional fabric, after having been stretched over the underlying plies is rolled down by the disks or rollers in the same manner as the preceding plies until such rollers reach the beads. Then, owing to the rather abrupt curved surfaces of these beads it is desirable that the smoothing-rollers travel inwardly more slowly, and to effect this the operator shifts the handle 87 to the left as the parts are viewed in Fig. 2, bringing the smaller friction-roller 96 into contact with the edge of wheel 71 and the larger friction-roller 91 out of such contact. During such slower inward advance of the rollers over the beads, the operator, if he desires, although it is not absolutely necessary, may decrease the inward pulling-action of the weight 108 on such rollers by applying pressure on the handle 113 in opposition to the inward pull of the weight, and in this way all tendency to dislodge the beads is overcome and the application of the fabric to the underlying plies and to the bead itself neatly effected. It will be noted that owing to the tilted arrangement of the disks, they are given a tendency to traverse the rather steep faces of the beads, and this tendency is accentuated by the shape of the edge of the disks, so that the disks owing to these foregoing characteristics pass in their traverse easily over the faces of the beads, and smooth the friction fabric down upon the beads and settle the latter into permanent position on the sides of the carcass. Owing to the yielding mountings of these disks or rollers on their supporting fulcrumed arms, they may shift position somewhat axially, against the centering action of the opposed springs 126 and 127 and automatically accommodate themselves to any slight irregularities of the beads.

When these rollers reach the inner abrupt faces 174 of the beads, that is, the surfaces between the clench or heel and toe of the beads, the operator releases the handle 87, permitting it to automatically resume its neutral position as determined by the action of spring 88, throwing the friction-wheel 96 out of coöperative relation with the wheel 71. The angular adjustment of the rollers is then shifted to the position indicated in Fig. 15, the rollers or disks being held in their new adjusted position, as will be readily understood, by the coöperation of the catches or detents 121 with the notches 123$^b$. This shifting of the position of the rollers is done to permit them to accommodate themselves more efficiently to the surfaces on which they are about to act. By grasping the handle 72 the operator holds the shaft 66 from turning, that is, holds the carriage from movement, and then by manipulating the handle 113 the tilted rollers are fed directly in back of the beads, applying the fabric without wrinkles or other defects to the abrupt faces 174, the advance edges only, of the disks being operative.

After the required number of plies have been placed on the core in the manner indicated, both beneath and over the beads, the pair of slides 137 are adjusted and held in adjusted position by the set-screws 146, and then the trimming-knives 143 are advanced or fed inwardly toward one another by turning the screws 139 so as to trim off the surplus material at the inner side of the carcass, that is, at the toes of the beads. During this trimming-operation the form is revolved at the same relatively high speed at which the rolling down or smoothing of the fabric is done. Then the trimming-knives are retracted, the slides pushed back, the carriage 63 slid back, and the core and tire-casing or carcass thereon removed from the chuck ready for finishing and curing and the machine is now in condition for the reception of a new form or core. It might be observed, however, that owing to the universal adjustment of which the trimming-knives are susceptible, the trimming is accomplished with effectiveness and despatch.

It should be noted that in the actuation of this improved machine during the stretching-operation, the middle-section of each ply of fabric is stretched longitudinally a definite percentage of its original length, such stretching being occasioned by the pulling-action of the form and the retarding or holding back action of the roller or drum 155. Since the concave checking-roller, desirably made of soft rubber, travels on the surface of the form, or the outermost ply if several plies have been placed on the form, the stretching of the layer or ply of fabric being applied is determined by the length of the surface on which the roller travels so that a definite percentage of stretch is brought about in each ply regardless of its original length, the various plies varying in their original length, being preliminarily cut in accordance with the usual practice.

Owing to this manner of applying these layers or plies, the middle zone of each one is stretched uniformly throughout its length and with the same degree of stretch that is given to all other plies. In this way in the finished product, each ply reinforces the others and is in turn reinforced and strengthened by them in their pressure-resisting qualities. The result is a carcass or tire-casing of remarkable strength and uniformity in its various characteristics.

Heretofore it has been proposed to use a friction band-brake to retard or brake the action of the stretching-roller, but these constructions have proved to be unsatisfactory in service owing to the lack of uniformity in the retarding-action of the brake on the roller, particularly when acting on plies of different temperatures. If the ply of fabric is being applied in a room relatively cool, a greater force or pull is necessary to obtain a certain degree of elongation or stretch, whereas if the same ply is stretched in a room of higher temperature the force necessary to stretch it is not so great, consequently, when a band-brake is employed it should be either adjusted to meet the different temperature requirements or else the amount of stretch in the plies will not be uniform. In my construction, however, owing to the positive connection between the stretching-roller and the retarding or checking-roller the amount of elongation given to each ply is necessarily the same percentage of its original length, the result being a tire-carcass possessing more uniform and greater strength than those heretofore produced.

To those skilled in this art, it will be apparent that some initial stretching of the fabric plies during the making of the tire-carcass is necessary in order to prevent undue enlargement or expansion of the casing or shoe when its inner tube is blown up, and it is carrying its load. It is important, however, that the plies should not be overstretched as has been customary in other tire-making machines which I am acquainted with, such undue stretching causing the casing to be weak when the load and pressure are applied, but on the other hand, if the plies are understretched the shoe or casing fails to keep its shape and to wear to the best advantage. This improved machine is so designed as to give the plies the proper percentage of stretch throughout their middle zones or sections. This, of course, means that a greater amount of fullness or surplus of stock must be absorbed in the sides of the tire than in those instances where the middle-portions of the plies are overstretched, but my mechanism efficiently applies the side-sections of the fabric plies to the core without defects, depending upon the principles of operation hereinabove outlined.

When plies are stretched on a core by hand, the workman grasps the edges of the ply and by pulling thereon causes an elongation or lengthening of the central section of the ply because of the rounded contour of the core, but he also at the same time stretches these side-sections which necessarily means an extra amount of fullness which must be condensed in the sides of the carcass. In this machine, however, the stretch of the side-portions is reduced to a minimum, thereby overcoming this obvious objection to hand-stretching.

Since my fabric-applying rollers are capable of yielding in practically all directions, their travel over the fabric and the splices is facilitated, without varying the pressure of the rollers on the fabric brought about by the action of a common weight on the two arms carrying the rollers. Another point of advantage in this construction is that the same rollers can be used on all parts of the tire, with the exception of the central section of the tread which is applied and caused to adhere in position during the application of the ply to the form, that is, during the stretching operation itself. It is also to be noted that another feature of superiority resides in the fact that no form-shields or shield-rollers are necessary for applying or guiding the fabric to the core. The structure of this mechanism is not only simple and inexpensive to produce, but the manufacturer is not required to have different machines for different sizes of cores and carcasses, because all ordinary sizes of tires can be made on one machine without adjustment or extra tools, it being merely necessary to use different forms or cores and pieces of frictioned fabric of appropriate size.

These machines can economically produce tire-casing carcasses because they can be operated at a relatively high speed, and although I provide means for reducing this speed of travel of the rollers over the beads, it should be borne in mind that such portions of the carcasses form a relatively small part of the whole, and it will be clear that the various parts of the carcass because of this change of speed, are built up and constructed with a maximum degree of economy of production.

While I have herein set forth with some degree of particularity and minuteness a description of the construction and operation of a preferred embodiment of this invention, it should be borne in mind that many mechanical changes may be made in the structure set forth without departure from the substance of the invention, and without the sacrifice of any of its substantial benefits and advantages. For instance, I have herein outlined a construction wherein the core or form revolves and the rollers remain relatively stationary, but of course, this operation could be reversed.

Whereas above I have described the fabric-applying roller as being tilted in a plane oblique to the path of rotation of the core at the point of action of the roller on the core, it is to be understood that this need be only a relative obliquity between the roller and such path of rotation, the essential feature being to give the roller an effective action upon the fabric in a path of appreciable width to accomplish the result referred to.

Above I have stated certain theories regarding the action which the various instrumentalities of the mechanism bring about on the frictioned fabric, but these theories are to be considered as illustrative only of the action, and I do not wish to be strictly bound thereby since the results brought about in the fabric by the action of this machine are novel and unusual. While they afford a good working basis for an understanding of the operation of the machine they may not be wholly free from error and for that reason I do not wish to be restricted and necessarily bound to them.

I claim:

1. In a tire-machine, the combination of a revoluble tire-core, a fabric-applying member located in a plane oblique to the path of rotation of the core at the point of action of such member on the core, and means to cause said fabric-applying member to travel in a spiral path over the core, substantially as described.

2. In a tire-machine, the combination of a revoluble tire-core, a fabric-applying roller located in a plane oblique to the path of rotation of the core at the point of action of the roller on the core, and means to cause said fabric-applying roller to travel in a spiral path over the core, substantially as described.

3. In a tire-machine, the combination of a revoluble tire-core, a fabric-applying member located in a plane oblique to the path of rotation of the core at the point of action of the member on the core, means yieldingly pressing said member toward the core, and means to cause said fabric-applying member to traverse the side of the core in a spiral path, substantially as described.

4. In a tire-machine, the combination of a revoluble tire-core, a fabric-applying member located in a plane oblique to the path of rotation of the core at the point of action of the member on the core, and means to feed said member inwardly toward the core-axis, whereby such member may act on successive portions of the tire-fabric to apply the same to the core or a previously applied underlying ply of fabric on the core, substantially as described.

5. In a tire-machine, the combination of a revoluble tire-core, a fabric-applying member located in a plane oblique to the path of rotation of the core at the point of action of the member on the core, means yieldingly pressing said member toward the core, and means to feed the member inwardly toward the core axis, whereby said member may act on successive portions of the tire-fabric to apply the same to the core or a previously applied underlying ply of fabric on the core, substantially as described.

6. In a tire-machine, the combination of a revoluble tire-core, a fabric-applying roller located in a plane oblique to the path of rotation of the core at the point of action of the roller on the core, means yieldingly pressing the fabric-applying roller toward the core, and means to feed the roller inwardly toward the core-axis during the rotation of the core, whereby the roller may act on successive portions of the tire-fabric to apply the same to the core or a previously applied underlying ply of fabric on the core, substantially as described.

7. In a tire-machine, the combination of a revoluble tire-core, a fabric-applying member, means tending to move said member toward the core, means to feed said member inwardly toward the axis of the core, whereby the member acts on successive portions of the tire-fabric to apply the same to the core or a previously applied ply of fabric on the core, and manually-operable means to regulate the action of said moving means on said member, substantially as described.

8. In a tire-machine, the combination of a revoluble tire-core, a pair of fabric-applying rollers adapted to act simultaneously on opposite sides of the core, means to press said rollers toward the core during the entire application of the fabric, means to feed said rollers inwardly toward the core-axis, whereby the rollers act on successive portions of the tire-fabric to apply the same to the core, or a previously applied underlying ply of fabric on the core, and a manually-operable means adapted to regulate the action of said roller-moving means on said rollers, substantially as described.

9. In a tire-machine, the combination of a revoluble tire-core, a pair of fabric-applying rollers adapted to simultaneously act on opposite sides of the core, means common to both of said rollers acting to move them with an equal pressure toward the core during the entire application of the fabric, means to feed said rollers inwardly toward the core-axis, whereby the rollers act on successive portions of the tire-fabric to apply the same to the core or a previously-applied underlying ply of fabric on the core, and a manually-operable means to regulate the action of said moving means on said rollers, substantially as described.

10. In a tire-machine, the combination of a revoluble tire-core, a fabric-applying roller, means to move said roller toward the core during the entire application of the fabric, means to exert on said roller a uniform pressure toward the core at all positions of the roller on the core, means to feed said roller inwardly toward the core-axis, whereby the roller acts progressively on successive portions of the tire-fabric to apply the same to the core or a previously applied underlying ply of fabric on the core, and manually-operable means to modify the action of said roller moving means, substantially as described.

11. In a tire-machine, the combination of a revoluble tire-core, a pair of fabric-applying members adapted to act simultaneously on opposite sides of the core, means common to both of said members to exert the same uniform pressure toward the core on both of the members at all positions of the latter on the core, means to feed said members inwardly toward the core-axis, whereby the members act on successive portions of the tire-fabric to apply the same to the core or a previously applied underlying ply of fabric on the core, and manual means to modify the action of said pressure-applying means on said members, substantially as described.

12. In a tire-making machine, the combination of a revoluble tire-core, a pair of fabric-applying members adapted to act simultaneously on opposite sides of the core, means common to both of said members to exert the same uniform pressure toward the core on both of said members at all positions of the latter on the core, means to feed said members inwardly toward the core axis, whereby the members act progressively on successive portions of the tire-fabric to apply the same to the core or a previously applied underlying ply of fabric on the core, and manual means to modify equally the action of said pressure-applying means on both of said members, substantially as described.

13. In a tire-machine, the combination of a revoluble tire-core, a carriage, a pair of arms fulcrumed on said carriage, a fabric-applying member on each of said arms, means acting on said arms tending to move said members toward the core during the entire application of the fabric, means to advance said carriage and members toward the core axis, whereby the members may act on successive portions of the tire-fabric to apply the same to the core or a previously applied underlying ply of fabric on the core, and manually-operable means to rock said arms on their fulcrums, whereby to modify the action of said arm-moving means, substantially as described.

14. In a tire-machine, the combination of a revoluble tire-core, a carriage, a pair of arms fulcrumed on said carriage, a fabric-applying member on each of said arms, a weight acting on and common to both of said arms tending to draw said arms toward the core, means to advance said carriage and members toward the core-axis, whereby the members may act on successive portions of the tire-fabric to apply the same to the core or a previously applied underlying ply of fabric on the core, and manually-operable means adapted to rock said arms on their fulcrums, whereby to modify the action of said weight on said arms, substantially as described.

15. In a tire-machine, the combination of a revoluble tire-core, a carriage, a pair of arms fulcrumed on said carriage, a fabric-applying roller mounted on each of said arms, said rollers being adapted to act simultaneously on opposite sides of the core, means acting on said arms tending to press or force said rollers toward the core, means to advance said carriage and rollers toward the axis of the core, whereby the rollers act on successive portions of the tire-fabric to apply the same to the core or a previously applied underlying ply of fabric on the core, a right-angle manually-operable lever connected to one of said arms, and a link connecting said lever to the other arm, whereby the operator is enabled to swing said arms on their fulcrums to modify the action of said arm-pressing means, substantially as described.

16. In a tire-machine, the combination of a revoluble tire-core, a carriage, a pair of arms fulcrumed on said carriage, a fabric-applying member on each of said arms, said members being adapted to act simultaneously on both sides of the core, a weight common to and acting on said arms tending to press or force the members toward the core, and manually-controlled means adapted to advance said carriage and members toward the axis of the core at any one of a plurality of speeds, whereby the members act progressively on opposite sides of the core on successive portions of the tire-fabric to apply the same to the core or a previously applied underlying ply of fabric on the core, the rate of advance of said carriage being determined in accordance with the contour of the surface to which the ply is being applied, substantially as described.

17. In a tire-machine, the combination of a revoluble tire-core, a carriage movable toward and away from the core, means to move said carriage, means mounted on said carriage and adapted to stretch the fabric as it is applied to the core, a second carriage mounted on said first-named carriage, a pair of fabric-applying members mounted on said second carriage and adapted to act simultaneously on opposite sides of the core, and means to advance said second carriage on the first carriage and members toward the axis of the core, whereby said members act on successive portions of the tire-fabric to apply the same to the core or a previously applied underlying ply of fabric on the core, substantially as described.

18. In a tire-machine, the combination of a revoluble tire-core, a carriage, means to actuate said carriage, means mounted on said carriage and adapted to stretch the ply of fabric as it is applied to the core, including a member adapted to travel on the surface of the core or plies already applied thereto, a second carriage mounted on said first-named carriage, a pair of rollers on said second carriage positioned to act simultaneously on opposite sides of the core, means yieldingly pressing said rollers toward the core, and means to advance said second carriage on the first carriage and rollers toward the axis of the core whereby such rollers act on successive portions of the tire-fabric to apply the same to the core or a previously applied underlying ply of fabric on the core, substantially as described.

19. In a tire-machine, the combination of a revoluble tire-core, a carriage, a checking-roller mounted on said carriage and adapted to frictionally engage the surface of the core or fabric plies thereon, a stretching-roller about which the ply of fabric passes to the core, gearing between said stretching and checking-rollers, a second carriage mounted on said first-named carriage, a pair of fabric-applying rollers mounted on said second carriage, means yieldingly pressing said fabric-applying rollers toward the core, said rollers being adapted to act simultaneously on opposite sides of the core, and means to advance said second carriage toward the core to permit said rollers to act progressively on successive portions of the tire-fabric to apply the same to the core or previously applied underlying plies of fabric on the core, substantially as described.

20. In a tire-machine, the combination of a revoluble tire-core, a carriage, a spring-pressed mounting on said carriage, a checking-roller in said mounting adapted to bear against the surface of the core or applied plies thereon, a stretching-roller in said mounting with which the strip of fabric as it is applied to the core co-acts, gearing between said checking and stretching-rollers whereby the latter has a definite movement with respect to the surface on which the checking-roller travels, a second carriage mounted on said first-named carriage, a pair of fabric-applying rollers mounted thereon adapted to act simultaneously on opposite sides of the core, means yieldingly pressing said rollers toward the core, and means to advance said second carriage on the first carriage and its rollers toward the axis of the core at different speeds of travel whereby the rollers act progressively on successive portions of the tire-fabric to apply the same to the core or previously applied underlying plies of fabric on the core, the different speeds of advance of said second carriage and rollers being employed for applying the fabric on different portions of the core and determined by the contour of the surface to which the ply is being applied, substantially as described.

21. In a tire-machine, the combination of a revoluble tire-core, a carriage movable toward the axis of the core, a fabric-applying roller mounted on said carriage and located in a plane oblique to the path of rotation of the core at the point of action of the roller on the core, means to hold the carriage substantially fixedly in position during the application of the fabric on the surface of the tire between the clench and toe of the bead, and means to cause said roller to traverse said surface during such holding of the carriage to apply the fabric thereto, substantially as described.

22. In a tire-machine, the combination of a revoluble tire-core, a fabric-applying roller, a mounting for said roller, a pair of centering-springs on said mounting between which said roller is accommodated, said springs permitting the roller to shift axially in opposite directions from its normal center position to accommodate itself to irregularities of the bead, and means to advance said roller and mounting toward the core axis, whereby the roller may act progressively on successive portions of the tire-fabric to apply the same to the core or previously applied plies, substantially as described.

23. A roller for applying frictioned fabric to a rotating core and smoothing said fabric upon the core, the boundary of the forward working-side or face being rounded off on a curve of short radius and meeting the back-face or side at its outer edge, substantially as described.

24. In a machine of the character described, the combination of a revoluble-core, means to shape a ply of fabric to the core, means for advancing said shaping-means across the core-face including a shaft, a friction drive wheel on the shaft, an actuating shaft adjacent to the friction drive wheel, differential friction rollers actuated by said second-named shaft, and means for forcing either of said rollers against the friction drive wheel, substantially as described.

25. In a machine of the character described, the combination of a revoluble-core, means for shaping a ply of fabric to the core, means for advancing said shaping-means across the core-face including a shaft, a friction drive wheel on the shaft, an actuating shaft adjacent to the friction drive wheel, differential friction rollers actuated by said second-named shaft, means for holding said rollers normally out of contact with said friction drive wheel, and means for forcing either of said rollers against the friction drive wheel, substantially as described.

26. In a machine of the character described, the combination of a revoluble-core, means for shaping a ply of fabric to the core, means for advancing said shaping-means across the core-face including a shaft, a friction drive wheel on the shaft, an actuating shaft adjacent to the friction drive wheel, an eccentric bearing for said actuating shaft equipped with an arm and a handle, a friction drive roller on said shaft, a friction drive roller of different size on said arm, and means to drive said latter roller from said actuating shaft, whereby rocking of the eccentric bearing will bring either one of said rollers into driving contact with the friction drive wheel, substantially as described.

27. In a machine of the character described, the combination of a revoluble core, means for shaping a ply of fabric to the core, means for advancing said shaping-means across the core-face including a shaft, a friction drive wheel on said shaft, an actuating shaft adjacent to the friction drive wheel, an eccentric bearing for said actuating-shaft equipped with a handle and an arm, a friction drive roller on said actuating shaft, a second friction drive roller of different size on said arm, means to operate said second roller from said actuating shaft, and means yieldingly holding said eccentric bearing in neutral position with neither of the rollers in contact with the drive-wheel, the parts being so related that by turning the eccentric bearing by its handle either of said rollers may be brought into operative relation to said drive wheel, substantially as described.

28. In a tire machine, the combination of a core, means for rotating the core, a support, a stitcher on the support, power driven mechanism to cause said stitcher to traverse the side of the core and change speed mechanism in said power mechanism.

29. In a tire machine, the combination of a core, means for rotating the core, a support, a pivotal mounting on said support, a stitcher carried on said mounting, power driven mechanism to cause said stitcher to traverse the side of the core and change speed mechanism in said power mechanism.

30. In a tire machine, the combination of a core, means for rotating the core, a support, a pivotal mounting on said support, a stitcher carried on said mounting movable to change the degree of angularity with relation to the tangent at the point of contact with the core, power driven means to cause the stitcher to traverse the side of the core, and change speed mechanism in said power means.

31. In a tire machine, the combination of a core, means for rotating the core, a support, a pivotal mounting on said support, a swinging arm mounted on said mounting, a stitcher carried on said arm, the stitcher during part of its operation being in one position of angularity with relation to the core, means for moving said arm about the pivot to cause the stitcher to assume different angularity with respect to the tangent at the point of contact with the core, and means for causing the stitcher to traverse the side of the core.

32. In a tire machine, the combination of a core, and means for rotating the same, a vertical pivotal mounting, an arm movable on said mounting, a stitcher on the end of said arm, a resilient mounting for said stitcher between the pivot and the end of the arm, and means for causing said stitcher to traverse the side of the core.

33. In a tire machine, a core, a support for the core, a stitching roller, means for rotating the core and means for causing the stitcher to traverse the side of the core, a second support, a pivotally mounted arm on the second support, a mounting on said arm for said stitching roller, means for maintaining said arm in one position during a portion of the stitching operation and for moving the arm about its pivot to change the angle of the stitcher roller with the core.

WILLIAM C. STEVENS.

Witnesses:
E. E. CAVENSHOFF,
E. M. HAHN.